United States Patent
Sasaki

(10) Patent No.: US 11,609,730 B1
(45) Date of Patent: Mar. 21, 2023

(54) IMAGE PROCESSING DEVICE, INFORMATION PROCESSING DEVICE, AND INFORMATION PROCESSING METHOD FOR AUTHENTICATION

(71) Applicant: TOSHIBA TEC KABUSHIKI KAISHA, Tokyo (JP)

(72) Inventor: Takahiro Sasaki, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/480,409

(22) Filed: Sep. 21, 2021

(51) Int. Cl.
  *G06F 3/12* (2006.01)
  *H04L 9/32* (2006.01)

(52) U.S. Cl.
  CPC .......... *G06F 3/1238* (2013.01); *G06F 3/1222* (2013.01); *G06F 3/1292* (2013.01); *H04L 9/3213* (2013.01)

(58) Field of Classification Search
  None
  See application file for complete search history.

(56) References Cited

U.S. PATENT DOCUMENTS

| | | | |
|---|---|---|---|
| 8,724,136 B2 | 5/2014 | Yamamoto | |
| 9,063,684 B2 | 6/2015 | Yamamoto | |
| 9,542,134 B2 | 1/2017 | Okumura et al. | |
| 2013/0055362 A1* | 2/2013 | Rathbun | H04L 63/18 726/5 |
| 2015/0154484 A1 | 6/2015 | Iwasaki et al. | |
| 2018/0278603 A1* | 9/2018 | Yabe | H04L 63/08 |

* cited by examiner

*Primary Examiner* — Thomas D Lee
(74) *Attorney, Agent, or Firm* — Foley & Lardner LLP

(57) ABSTRACT

According to at least one embodiment, an image processing device includes a monitor, a communication interface, and a processor. The monitor is configured to display a login for logging in to a first information processing device. The communication interface is configured to communicate data with a second information processing device. The processor is configured to transmit a request for an authentication code from the first information processing device to the second information processing device via the communication interface and receive a response from the second information processing device via the communication interface. The response includes the authentication code.

3 Claims, 6 Drawing Sheets

IMAGE PROCESSING DEVICE, INFORMATION PROCESSING DEVICE, AND INFORMATION PROCESSING METHOD FOR AUTHENTICATION

FIELD

Embodiments described herein relate generally to an image processing device, an information processing device, and an information processing method.

BACKGROUND

A terminal, such as a mobile device, may be used to log in to an image processing device by performing biometric authentication. Such an image processing device connects to a terminal that performs biometric authentication, and acquires information or tokens related to the success or failure of authentication from the terminal.

In the related art, the image processing device needs to communicate with the authentication terminal.

DETAILED DESCRIPTION

At least one embodiments described herein provides an image processing device, an information processing device, and an information processing method that can acquire information related to login without communicating with an authentication terminal.

In general, according to at least one embodiment, the image processing device includes a monitor, a communication interface, and a processor. The monitor displays a login URL for logging in to a first information processing device. The communication interface transmits and receives data to and from a second information processing device. The processor transmits a request for an authentication code from the first information processing device to the second information processing device through the communication interface and receives a response including the authentication code from the second information processing device through the communication interface.

Hereinafter, at least one embodiment will be described with reference to the drawings.

The authentication system according to at least one embodiment authenticates a user using a user terminal. If the authentication system authenticates the user, the image processing device shifts to the login state. If the image processing device is in the login state, the image processing device forms an image on a medium such as paper according to an operation from the user.

Figure 1:
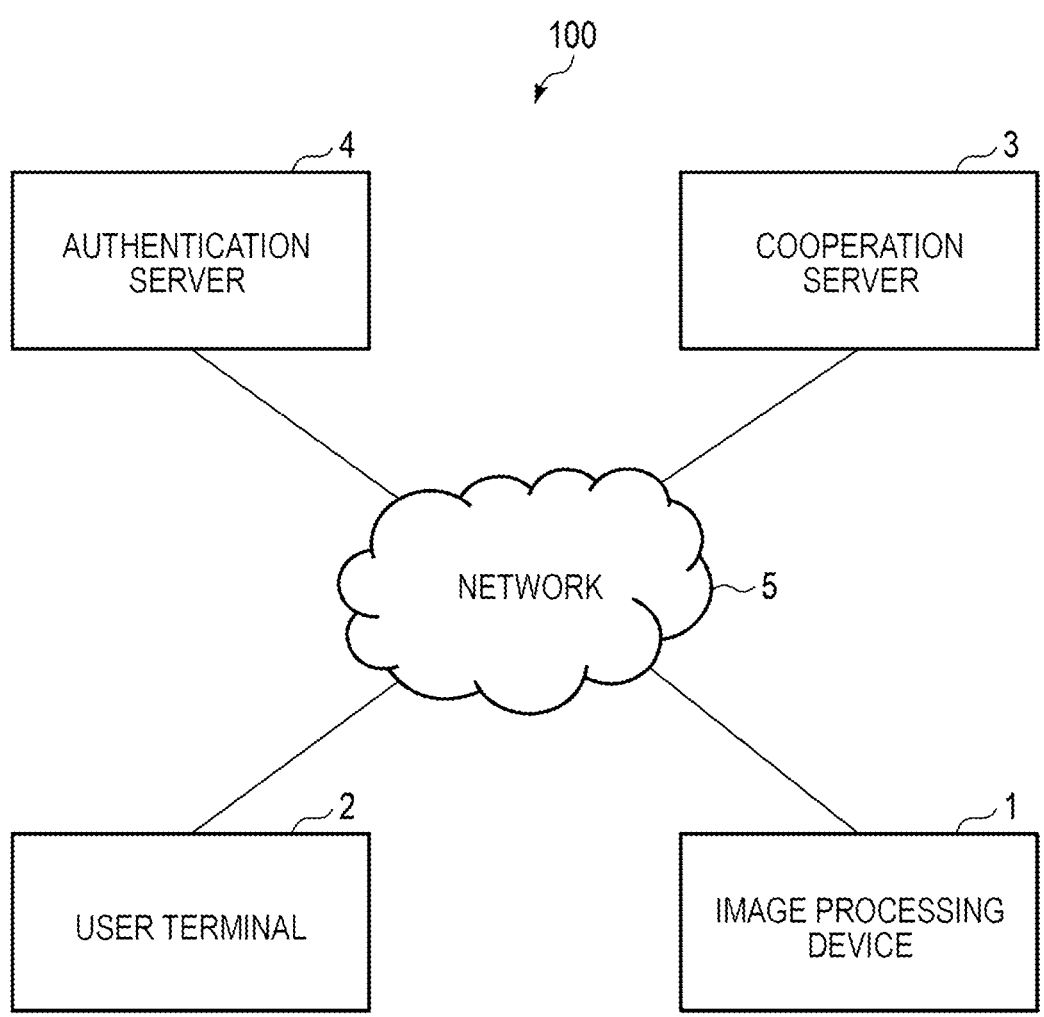
FIG. 1 is a block diagram showing a configuration example of an authentication system according to an embodiment.

FIG. 1 shows a configuration example of an authentication system 100. As shown in FIG. 1, the authentication system 100 includes an image processing device 1, a user terminal 2, a cooperation server 3, an authentication server 4, and the like. The image processing device 1, the user terminal 2, the cooperation server 3, and the authentication server 4 are connected to a network 5.

The image processing device 1 shifts to the login state related to the predetermined user based on the information from the authentication server 4. If the image processing device 1 shifts to the login state, the image processing device 1 forms an image on the medium according to an operation from the user or the like. The image processing device 1 will be described in detail later.

The user terminal 2 is a terminal owned by the user. The user terminal 2 authenticates the user. Here, the user terminal 2 performs biometric authentication. If the user is authenticated, the user terminal 2 acquires the authentication code from the authentication server 4. For example, the authentication code is an authcode that follows OAuth 2.0. The user terminal 2 will be described in detail later.

The cooperation server 3 (e.g., information processing device, second information processing device) transmits the authentication code acquired by the user terminal 2 to the image processing device 1. The cooperation server 3 will be described in detail later.

The authentication server 4 (e.g., the first information processing device) transmits an authentication code to the user terminal 2. Further, the authentication server 4 transmits an access token to the image processing device 1. Further, the authentication server 4 transmits the user information to the image processing device 1. The authentication server 4 will be described in detail later.

The network 5 is a communication network for transmitting and receiving data. The network 5 relays communication between the image processing device 1, the user terminal 2, the cooperation server 3, and the authentication server 4. Here, the network 5 is the Internet.

Figure 2:
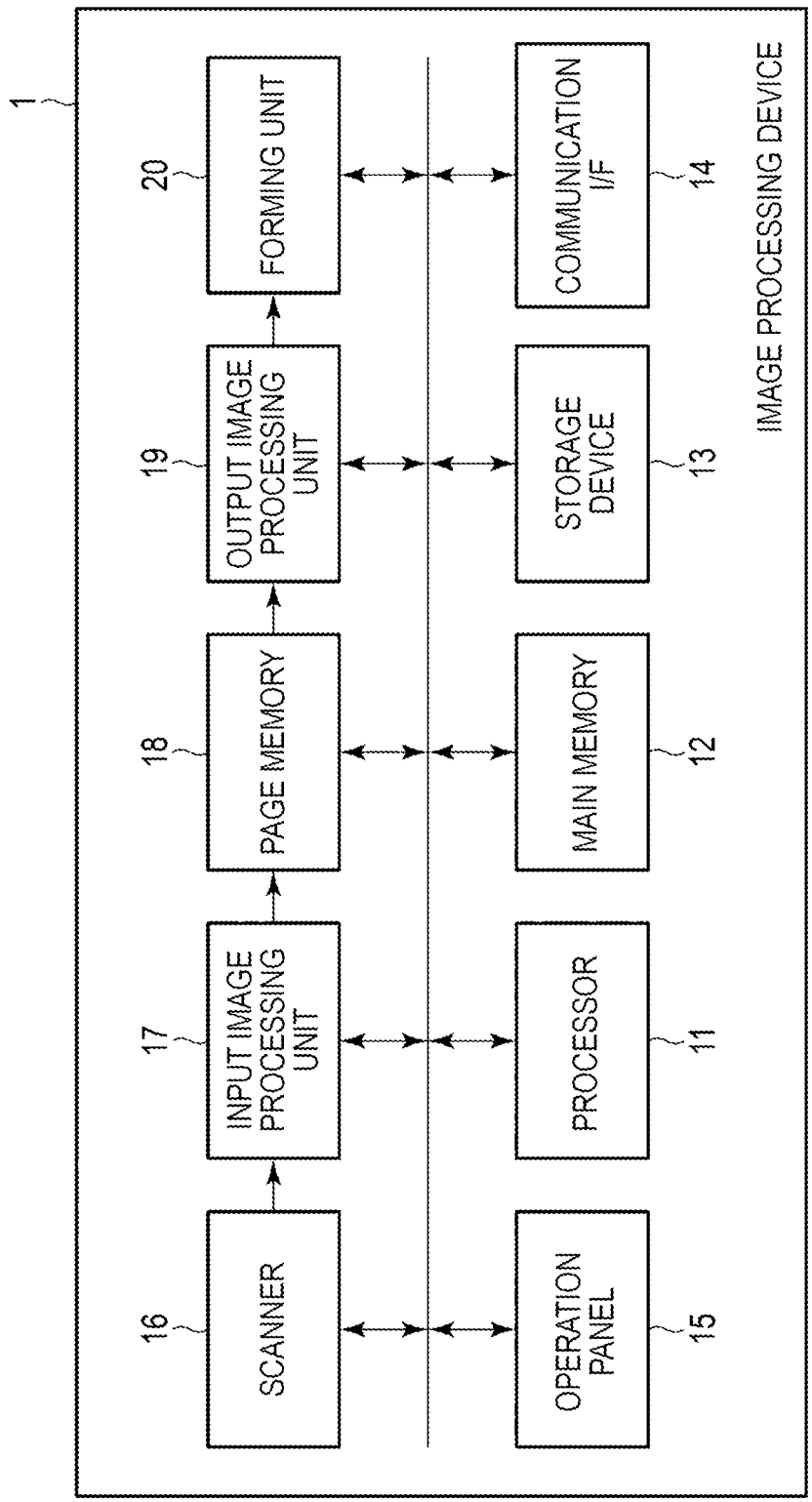
FIG. 2 is a block diagram showing a configuration example of an image processing device.

FIG. 2 is a block diagram showing a configuration example of the image processing device 1 according to at least one embodiment. As shown in FIG. 2, the image processing device 1 includes a processor 11, a main memory 12, a storage device 13, a communication interface 14, an operation panel 15, a scanner 16, an input image processing unit 17 (e.g., an input image processor), a page memory 18, an output image processing unit 19 (e.g., an output image processor), a forming unit 20 (e.g., a forming device), and the like. Each of the units (e.g., devices) is connected to each other via a data bus or the like.

The image processing device 1 may have a configuration as required in addition to the configuration shown in FIG. 2 or a specific configuration may be excluded from the image processing device 1.

The processor 11 has the function of controlling the operation of the entire image processing device 1. The processor 11 may include an internal memory, various interfaces, and the like. The processor 11 implements various processes by executing a program stored in advance by the internal memory, the storage device 13, or the like.

Some of the various functions implemented by the processor 11 executing the program may be implemented by a hardware circuit. In this case, the processor 11 controls the functions executed by the hardware circuit.

The main memory 12 is a volatile memory. The main memory 12 is a working memory or a buffer memory. The main memory 12 stores various application programs based on commands from the processor 11. Further, the main memory 12 may store data necessary for executing the application program, an execution result of the application program, and the like.

The storage device 13 is a non-volatile memory capable of writing and rewriting data. The storage device 13 is composed of, for example, a hard disk drive (HDD), a solid state drive (SSD), a flash memory, or the like. The storage device 13 stores a control program, an application, various data, and the like according to the operational use of the image processing device 1.

The communication interface 14 is an interface for connecting to the network 5. That is, the communication interface 14 transmits and receives data to and from the cooperation server 3 and the authentication server 4 via the network 5. For example, the communication interface 14 supports a wired or wireless local area network (LAN) connection.

Various instructions are input to the operation panel 15 by the operator of the image processing device 1. The operation panel 15 transmits a signal indicating an instruction input to the operator to the processor 11. The operation panel 15 includes, for example, a keyboard, a numeric keypad, a touch panel, and the like as operation units.

Further, the operation panel 15 displays various information to the operator of the image processing device 1. That is, the operation panel 15 displays a screen showing various information based on the signal from the processor 11. The operation panel 15 includes a monitor such as a liquid crystal display as a display unit (e.g., a display, a display device).

The scanner 16 optically scans the document and reads the image of the document as image data. The scanner 16 reads the document as a color image or a monochrome image. The scanner 16 is composed of a sensor array formed in the main scanning direction, and the like. The scanner 16 moves the sensor array in the sub-scanning direction and scans the entire document.

The input image processing unit 17 processes the image data read by the scanner 16. The input image processing unit 17 may process image data from other than the scanner 16. For example, the input image processing unit 17 may process image data sent from a USB memory, a PC, a smartphone, or the like.

The page memory 18 stores the image data processed by the input image processing unit 17.

The output image processing unit 19 processes the image data stored in the page memory 18 so that the forming unit 20 can print the image data on paper.

The forming unit 20 prints the image data processed by the output image processing unit 19 on paper under the control of the processor 11.

The forming unit 20 prints image data on paper by an electrophotographic method. The forming unit 20 includes a transfer body, a photoconductor drum that transfers the toner image to the transfer body, a transfer roller that transfers the toner image from the transfer body to the paper, a heater that heats the paper on which the toner image is transferred, and the like.

The forming unit 20 may print image data on paper by an inkjet method. The configuration of the forming unit 20 is not limited to a specific configuration.

Next, the user terminal 2 will be described.

Figure 3:
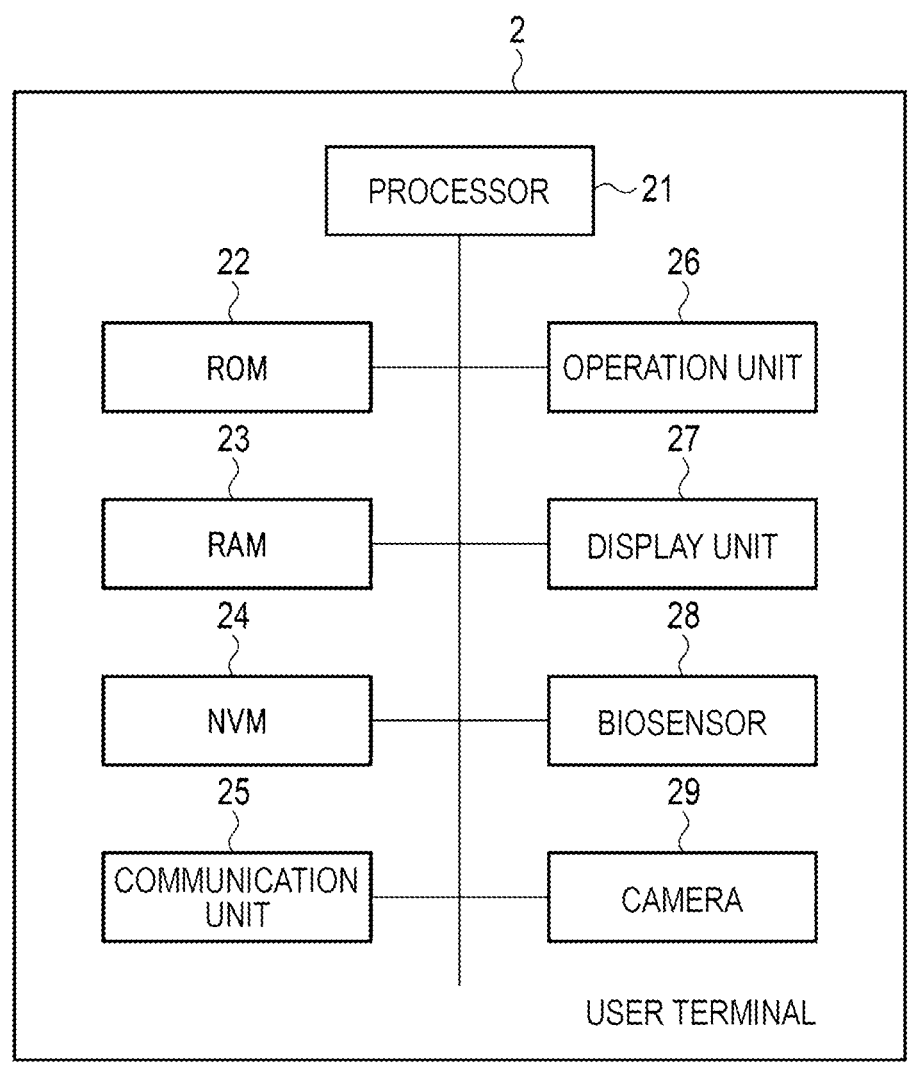
FIG. 3 is a block diagram showing a configuration example of a user terminal.

FIG. 3 shows a configuration example of the user terminal 2. FIG. 3 is a block diagram showing a configuration example of the user terminal 2. As shown in FIG. 3, the user terminal 2 includes a processor 21, a ROM 22, a RAM 23, an NVM 24, a communication unit 25 (e.g., a communication device), an operation unit 26 (e.g., an operation device), a display unit 27 (e.g., a display), a biosensor 28, a camera 29, and the like.

The processor 21 is connected to the ROM 22, the RAM 23, the NVM 24, the communication unit 25, the operation unit 26, the display unit 27, the biosensor 28, and the camera 29 via a data bus or the like.

The user terminal 2 may have a configuration as required in addition to the configuration shown in FIG. 3 or a specific configuration may be excluded from the user terminal 2.

The processor 21 has the function of controlling the operation of the entire user terminal 2. The processor 21 may include an internal cache, various interfaces, and the like. The processor 21 implements various processes by executing a program stored in advance in the internal memory, the ROM 22 or the NVM 24.

Some of the various functions implemented by the processor 21 executing the program may be implemented by a hardware circuit. In this case, the processor 21 controls the functions executed by the hardware circuit.

The ROM 22 is a non-volatile memory in which a control program, control data, and the like are stored in advance. The control program and control data stored in the ROM 22 are incorporated in advance according to the specifications of the user terminal 2.

The RAM 23 is a volatile memory. The RAM 23 temporarily stores data and the like being processed by the processor 21. The RAM 23 stores various application programs based on commands from the processor 21. Further, the RAM 23 may store data necessary for executing the application program, an execution result of the application program, and the like.

The NVM 24 is a non-volatile memory capable of writing and rewriting data. The NVM 24 is composed of, for example, an HDD, an SSD, a flash memory, or the like. The NVM 24 stores a control program, an application, various data, and the like according to the operational use of the user terminal 2.

The communication unit 25 is an interface for connecting to the network 5. That is, the communication unit 25 transmits and receives data to and from the cooperation server 3 and the authentication server 4 via the network 5. For example, the communication unit 25 supports a wired or wireless LAN connection.

The operation unit 26 receives input of various operations from the user. The operation unit 26 transmits a signal indicating the input operation to the processor 21. The operation unit 26 may be composed of a touch panel.

The display unit 27 displays the image data from the processor 21. For example, the display unit 27 is composed of a liquid crystal monitor. If the operation unit 26 is composed of a touch panel, the display unit 27 may be integrally formed with the operation unit 26.

The biosensor 28 acquires the biometric information of the user. For example, the biosensor 28 acquires a fingerprint (for example, a fingerprint image) from any of the fingers as biometric information. The biosensor 28 transmits the acquired biometric information to the processor 21. The biosensor 28 may transmit the acquired feature data of the biometric information to the processor 21.

Further, the biometric information acquired by the biosensor 28 may be other than a fingerprint. For example, the biometric information may be a vein pattern such as a finger or a palm, an iris, a facial image, or a voiceprint. The structure of biometric information is not limited to a specific configuration.

The camera 29 photographs an object such as a code described later. The camera 29 transmits the image obtained by photographing to the processor 21.

The camera 29 may have a zoom function. Further, the camera 29 may be provided with a light source that illuminates the object. For example, the camera 29 is a CCD (Charge Coupled Device) camera or the like.

Next, the cooperation server 3 will be described.

Figure 4:
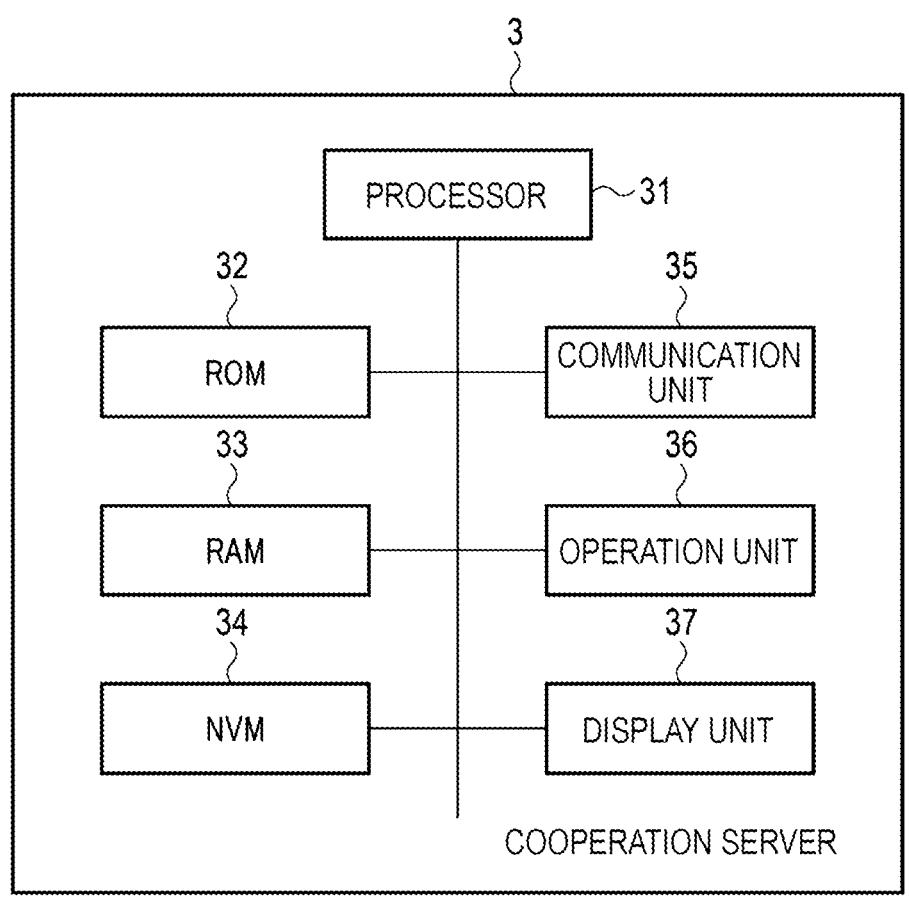
FIG. 4 is a block diagram showing a configuration example of a cooperation server.

FIG. 4 shows a configuration example of the cooperation server 3. FIG. 4 is a block diagram showing a configuration example of the cooperation server 3. As shown in FIG. 4, the cooperation server 3 includes a processor 31, a ROM 32, a RAM 33, an NVM 34, a communication unit 35 (e.g., a communication device), an operation unit 36 (e.g., an operation device), a display unit 37 (e.g., a device), and the like.

The processor 31 is connected to the ROM 32, the RAM 33, the NVM 34, the communication unit 35, the operation unit 36, and the display unit 37 via a data bus or the like.

The cooperation server 3 may have a configuration as required in addition to the configuration shown in FIG. 4 or a specific configuration may be excluded from the cooperation server 3.

The processor 31 has the function of controlling the operation of the entire cooperation server 3. The processor 31 may include an internal cache, various interfaces, and the like. The processor 31 implements various processes by executing a program stored in advance in the internal memory, the ROM 32, or the NVM 34.

Some of the various functions implemented by the processor 31 executing the program may be implemented by a hardware circuit. In this case, the processor 31 controls the functions executed by the hardware circuit.

The ROM 32 is a non-volatile memory in which a control program, control data, and the like are stored in advance. The control program and control data stored in the ROM 32 are incorporated in advance according to the specifications of the cooperation server 3.

The RAM 33 is a volatile memory. The RAM 33 temporarily stores data and the like being processed by the processor 31. The RAM 33 stores various application programs based on commands from the processor 31. Further, the RAM 33 may store data necessary for executing the application program, an execution result of the application program, and the like.

The NVM 34 is a non-volatile memory capable of writing and rewriting data. The NVM 34 is composed of, for example, an HDD, an SSD, a flash memory, or the like. The NVM 34 stores a control program, an application, various data, and the like according to the operational use of the cooperation server 3.

The communication unit 35 (e.g., the communication interface) is an interface for connecting to the network 5. That is, the communication unit 35 transmits and receives data to and from the image processing device 1 and the like via the network 5. For example, the communication unit 35 supports a wired or wireless LAN connection.

The operation unit 36 receives input of various operations from the user. The operation unit 36 transmits a signal indicating the input operation to the processor 31. The operation unit 36 may be composed of a touch panel.

The display unit 37 displays the image data from the processor 31. For example, the display unit 37 is composed of a liquid crystal monitor. If the operation unit 36 is composed of a touch panel, the display unit 37 may be integrally formed with the operation unit 36.

Next, the authentication server 4 will be described.

Figure 5:
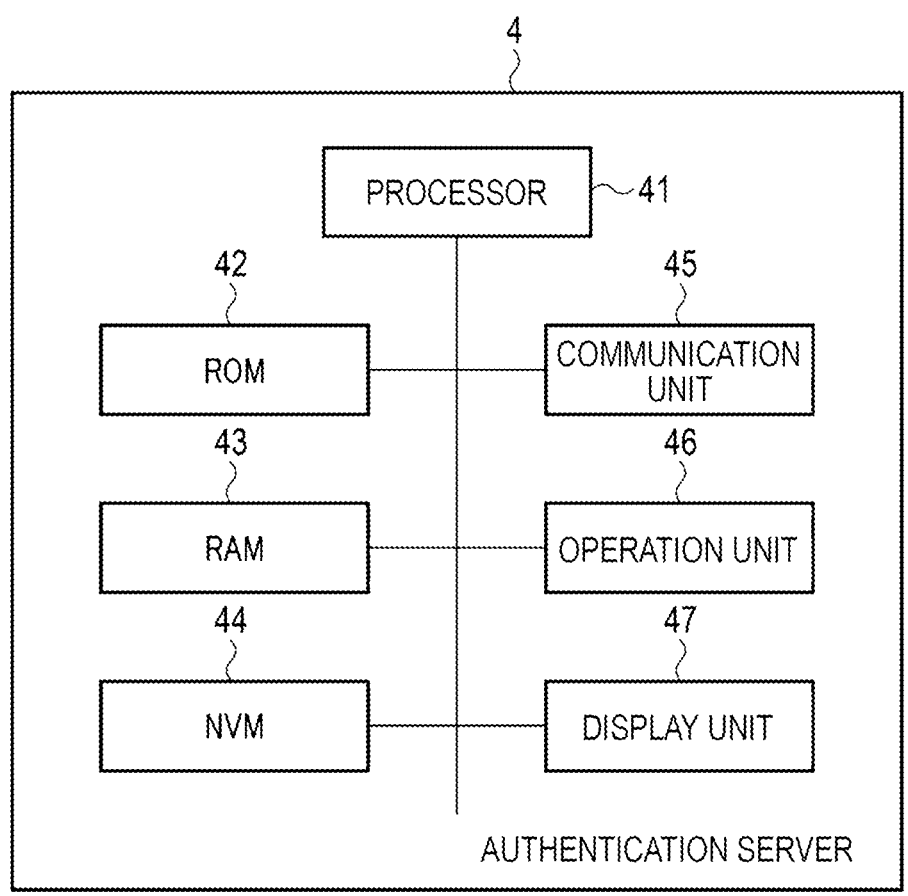
FIG. 5 is a block diagram showing a configuration example of an authentication server.

FIG. 5 shows a configuration example of the authentication server 4. FIG. 5 is a block diagram showing a configuration example of the authentication server 4. As shown in FIG. 5, the authentication server 4 includes a processor 41, a ROM 42, a RAM 43, an NVM 44, a communication unit 45 (e.g., a communication device), an operation unit 46 (e.g., an operation device), a display unit 47 (e.g., a display), and the like.

The processor 41 is connected to the ROM 42, the RAM 43, the NVM 44, the communication unit 45, the operation unit 46, and the display unit 47 via a data bus or the like.

The authentication server 4 may have a configuration as required in addition to the configuration shown in FIG. 5 or a specific configuration may be excluded from the authentication server 4.

The processor 41 has the function of controlling the operation of the entire authentication server 4. The processor 41 may include an internal cache, various interfaces, and the like. The processor 41 implements various processes by executing a program stored in advance in the internal memory, the ROM 42, or the NVM 44.

Some of the various functions implemented by the processor 41 executing the program may be implemented by a hardware circuit. In this case, the processor 41 controls the functions executed by the hardware circuit.

The ROM 42 is a non-volatile memory in which a control program, control data, and the like are stored in advance. The control program and control data stored in the ROM 42 are incorporated in advance according to the specifications of the authentication server 4.

The RAM 43 is a volatile memory. The RAM 43 temporarily stores data and the like being processed by the processor 41. The RAM 43 stores various application programs based on commands from the processor 41. Further, the RAM 43 may store data necessary for executing the application program, an execution result of the application program, and the like.

The NVM 44 is a non-volatile memory capable of writing and rewriting data. The NVM 44 is composed of, for example, an HDD, an SSD, a flash memory, or the like. The NVM 44 stores a control program, an application, various data, and the like according to the operational use of the authentication server 4.

The communication unit 45 is an interface for connecting to the network 5. That is, the communication unit 45 transmits and receives data to and from the image processing device 1 and the user terminal 2 via the network 5. For example, the communication unit 45 supports a wired or wireless LAN connection.

The operation unit 46 receives input of various operations from the user. The operation unit 46 transmits a signal indicating the input operation to the processor 41. The operation unit 46 may be composed of a touch panel.

The display unit 47 displays the image data from the processor 41. For example, the display unit 47 is composed of a liquid crystal monitor. If the operation unit 46 is composed of a touch panel, the display unit 47 may be integrally formed with the operation unit 46.

Next, the functions implemented by the authentication server 4 will be described. The functions implemented by the authentication server 4 are implemented by the processor 41 executing a program stored in the internal memory, the ROM 42, the NVM 44, or the like.

First, the processor 41 has the function of receiving a user's login through the user terminal 2.

The processor 41 receives access from the user terminal 2 to a URL (login URL) for displaying the login screen through the communication unit 45. Upon receiving the access to the login URL, the processor 41 transmits the login-related information to the user terminal 2 through the communication unit 45.

As will be described later, the user terminal 2 authenticates the user.

If the user terminal 2 authenticates the user, the processor 41 receives a request through the communication unit 45 from the user terminal 2 indicating information indicating that the authentication was successful. That is, the processor 41 receives a request for the user's login from the user terminal 2 through the communication unit 45.

Upon receiving the information, the processor 41 receives the user's login.

Further, the processor 41 has the function of transmitting an authentication code to the cooperation server 3 if the user's login is received.

Upon receiving the user's login, the processor 41 generates an authentication code for acquiring an access token. If the authentication code is generated, the processor 41 generates a response for transmitting the authentication code to the cooperation server 3.

The response is redirected to access the cooperation server 3. That is, the response causes the authentication code to be transmitted to the cooperation server 3 which is the redirect destination. The response includes the URL and the authentication code of the cooperation server 3 which is the redirect destination.

For example, the NVM 44 stores the URL of the redirect destination for each service in advance. Here, the NVM 44 stores the URL of the cooperation server 3 in advance corresponding to the service related to the login process of the image processing device 1.

For example, the processor 41 identifies the application that transmitted the request. The processor 41 acquires the URL of the redirect destination corresponding to the service of the specified application from the NVM 44.

If the response is generated, the processor 41 transmits the generated response to the user terminal 2 through the communication unit 45.

As will be described later, the user terminal 2 transmits the authentication code included in the response to the cooperation server 3 according to the response.

Further, the processor 41 has the function of transmitting an access token to the image processing device 1.

The processor 41 receives a request for an access token from the image processing device 1 through the communication unit 45. The request includes the authentication code.

Upon receiving the request, the processor 41 acquires the access token corresponding to the authentication code included in the request. The access token is used to acquire user information.

If the access token is acquired, the processor 41 transmits a response including the access token to the image processing device 1 through the communication unit 45.

Further, the processor 41 has the function of transmitting user information to the image processing device 1.

The processor 41 receives a request for user information related to the user from the image processing device 1 through the communication unit 45. The request includes the access token.

Upon receiving the request, the processor 41 acquires the user information corresponding to the access token included in the request.

For example, the NVM 44 stores user information in advance. The user information is the information used for the image processing device 1 to shift to the login state. For example, the user information is a user ID, a user name, an e-mail address, or the like. The configuration of user information is not limited to a specific configuration.

For example, the processor 41 acquires the user information corresponding to the access token from the NVM 44.

If the user information is acquired, the processor 41 transmits a response including the user information to the image processing device 1 through the communication unit 45.

Next, the functions implemented by the cooperation server 3 will be described. The functions implemented by the cooperation server 3 are implemented by the processor 31 executing a program stored in the internal memory, the ROM 32, the NVM 34, or the like.

The processor 31 has the function of transmitting an authentication code to the image processing device 1.

First, the processor 31 receives a request for an authentication code from the image processing device 1 through the communication unit 35.

As will be described later, the image processing device 1 transmits the request to the cooperation server 3 by polling. Therefore, the processor 31 receives the request at predetermined intervals.

While receiving the request, the processor 31 waits until the authentication code is received from the user terminal 2.

Upon receiving the authentication code from the user terminal, the processor 31 transmits a response including the authentication code to the image processing device 1 through the communication unit 35.

Next, the functions implemented by the image processing device 1 will be described. The functions implemented by the image processing device 1 are implemented by the processor 11 executing a program stored in the storage device 13 or the like.

First, the processor 11 has a function of displaying a code indicating a login URL.

For example, the processor 11 receives an input of an operation for logging in through the operation panel 15. Upon receiving the input of the operation for logging in, the processor 11 causes the operation panel 15 to display the code obtained by encoding the login URL.

For example, the storage device 13 stores the login URL in advance. The processor 11 acquires the login URL from the storage device 13. Upon obtaining the login URL, the processor 11 encodes the login URL according to a predetermined algorithm to generate a code. If the code is generated, the processor 11 displays the generated code on the operation panel 15.

Further, the storage device 13 may store in advance a code (e.g., image) obtained by encoding the login URL. The processor 11 may display the code acquired from the storage device 13 on the operation panel 15.

For example, the code is a one-dimensional code or a two-dimensional code. The configuration of the code is not limited to a specific configuration.

Further, the processor 11 has the function of receiving an authentication code from the cooperation server 3.

If the code is displayed on the operation panel 15, the processor 11 transmits a request for an authentication code to the cooperation server 3 by polling through the communication interface 14. That is, the processor 11 transmits the request to the cooperation server 3 at predetermined intervals through the communication interface 14.

While transmitting the request, the processor 11 waits until a response including the authentication code is received from the cooperation server 3.

If the cooperation server 3 transmits a response including the authentication code to the image processing device 1, the processor 11 receives the response from the cooperation server 3 through the communication interface 14.

Further, the processor 11 has the function of receiving user information from the authentication server 4.

Upon receiving the response, the processor 11 transmits a request for an access token to the authentication server 4 through the communication interface 14. The request includes the authentication code.

If the request is transmitted, the processor 11 receives a response including an access token from the authentication server 4 through the communication interface 14.

Upon receiving the response, the processor 11 transmits a request for user information to the authentication server 4 through the communication interface 14. The request includes the access token.

If the request is transmitted, the processor 11 receives a response including user information from the authentication server 4 through the communication interface 14.

Further, the processor 11 has a function of shifting to the login state based on the user information.

Upon receiving the response, the processor 11 shifts to the login state based on the user information included in the response. For example, the processor 11 causes the operation panel 15 to display a user name or the like indicated by user information. Further, the processor 11 performs processing related to the image such as a printing operation, a scanning operation, or a copying operation based on the authority corresponding to the user information.

Next, the functions realized by the user terminal 2 will be described. The functions realized by the user terminal 2 are implemented by the processor 21 executing a program stored in the internal memory, the ROM 22, the NVM 24, or the like.

First, the processor 21 has the function of reading the code obtained by encoding the login URL.

The processor 21 receives an input of an operation for starting the login process through the operation unit 26 or the like. For example, the processor 21 receives a tap on an icon for launching a predetermined application.

Upon receiving the input of the operation, the processor 21 activates the camera 29.

Here, it is assumed that the operation panel 15 displays the code obtained by encoding the login URL. Further, the user shall move the camera 29 (or the user terminal 2) to a position where the code can be photographed.

The camera 29 photographs the code. The camera 29 transmits the image obtained by photographing to the processor 21.

The processor 21 acquires an image obtained by photographing the code from the camera 29. If the image is acquired, the processor 21 decodes the code and acquires the login URL. If the login URL is acquired, the processor 21 accesses the login URL.

When accessing the login URL, the processor 21 authenticates the user. Here, the processor 21 performs biometric authentication.

For example, the user inputs his or her own biometric information into the biosensor 28. The biosensor 28 transmits the input biometric information to the processor 21.

The processor 21 acquires the biometric information of the user from the biosensor 28. If the biometric information is acquired, the processor 21 authenticates the user based on the biometric information.

Here, the NVM 24 stores a template for authenticating the user in advance. The template shows the biometric information of the user or the feature data of the biometric information. If the acquired biometric information and the template match, the processor 21 determines that the user was successfully authenticated.

If it is determined that the user authentication was successful, the processor 21 logs in to the authentication server 4 according to the information obtained by accessing the login URL through the communication unit 25. For example, the processor 21 transmits a request indicating information indicating that the authentication was successful to the authentication server 4 through the communication unit 25. That is, the processor 21 transmits a request for the user's login to the authentication server 4 through the communication unit 25.

Further, the processor 21 has the function of transmitting an authentication code to the cooperation server 3.

As described above, upon receiving the user's login, the authentication server 4 transmits a response to the user terminal 2 to transmit the authentication code to the cooperation server 3.

The processor 21 receives the response through the communication unit 25. Upon receiving the response, the processor 21 acquires the redirect destination (cooperation server 3) from the response. If the redirect destination is acquired, the processor 21 transmits the authentication code included in the response to the redirect destination (cooperation server 3) through the communication unit 25.

Next, an operation example of the authentication system 100 will be described.

Figure 6:
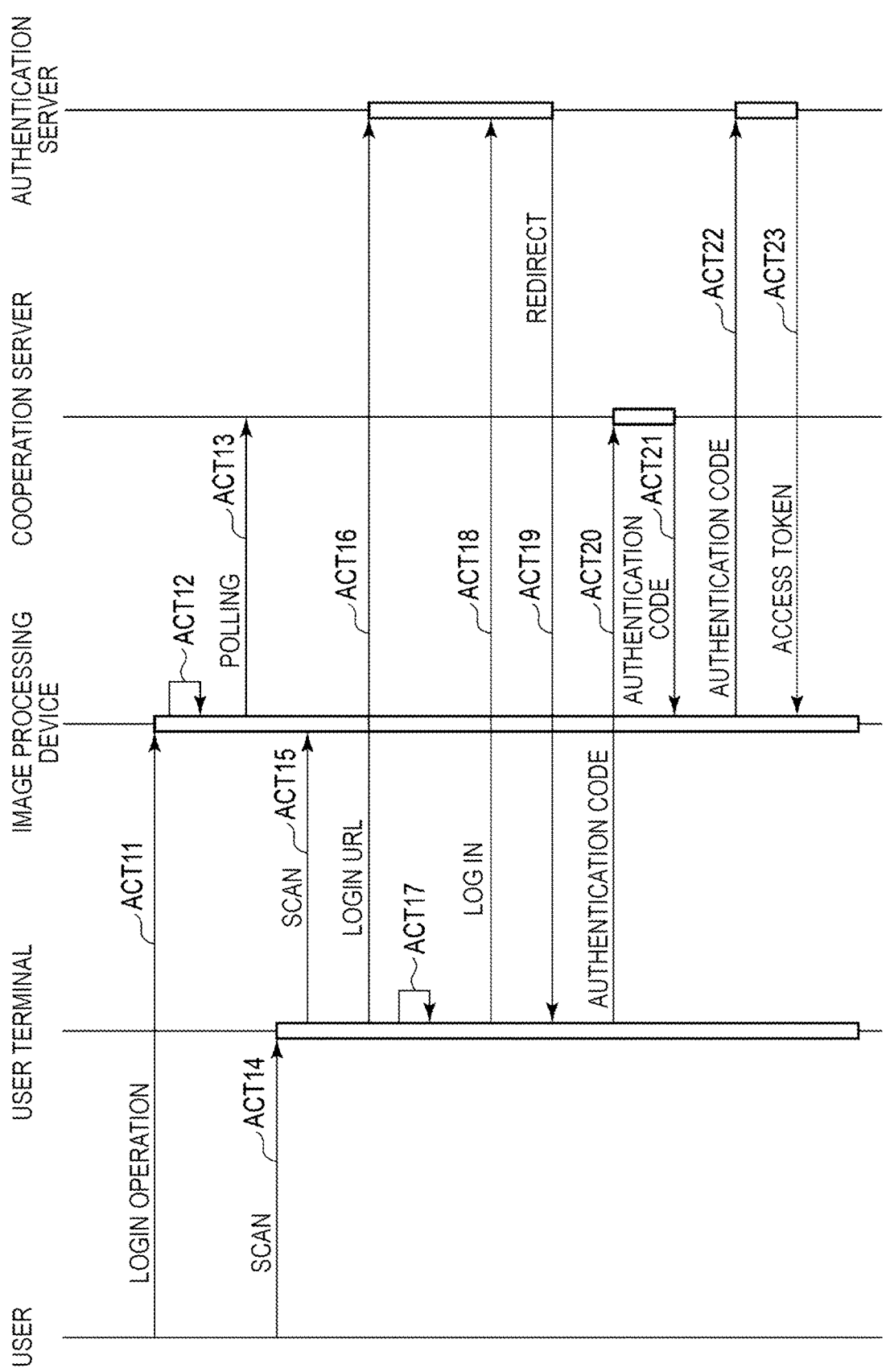
FIG. 6 is a sequence diagram showing an operation example of the authentication system.

FIG. 6 is a sequence diagram for illustrating an operation example of the authentication system 100.

First, the user inputs an operation for performing the login process to the image processing device 1 (ACT 11).

The processor 11 of the image processing device 1 receives the input of the operation through the operation panel 15 or the like. Upon receiving the input of the operation, the processor 11 causes the operation panel 15 to display the code obtained by encoding the login URL (ACT 12).

If the code is displayed on the operation panel 15, the processor 11 transmits a request for an authentication code to the cooperation server 3 by polling through the communication interface 14 (ACT 13).

Here, the user moves the camera 29 to a position where the code can be read (ACT 14).

If the user moves the camera 29, the processor 21 of the user terminal 2 acquires an image obtained by photographing the code from the camera 29 (ACT 15). Upon acquiring the image, the processor 21 accesses the login URL indicated by the code through the communication unit 25 (ACT 16).

Upon accessing the login URL, the processor 21 authenticates the user (ACT 17). Here, it is assumed that the processor 21 succeeded in authenticating the user.

If the user authentication is successful, the processor 21 logs in to the authentication server 4 through the communication unit 25 (ACT 18).

The processor 41 of the authentication server 4 receives the user's login. Upon receiving the user's login, the processor 41 transmits a response for transmitting the authentication code to the cooperation server 3 to the user terminal 2 through the communication unit 45 (ACT 19).

The processor 21 of the user terminal 2 receives the response through the communication unit 25. Upon receiving the response, the processor 21 transmits the authentication code included in the response to the cooperation server 3 through the communication unit 25 (ACT 20).

The processor 31 of the cooperation server 3 receives the authentication code from the user terminal 2 through the communication unit 35. Upon receiving the authentication code, the processor 31 transmits a response including the authentication code to the image processing device 1 through the communication unit 35 (ACT 21).

The processor 11 of the image processing device 1 receives the response through the communication interface 14. Upon receiving the response, the processor 11 transmits a request for an access token to the authentication server 4 through the communication interface 14 (ACT 22). The request includes an authentication code.

The processor 41 of the authentication server 4 receives the request through the communication unit 45. Upon receiving the request, the processor 41 transmits a response including the access token to the image processing device 1 through the communication unit 45 (ACT 23).

The processor 11 of the image processing device 1 receives the response through the communication interface 14. If the processor 11 receives the response, the authentication system 100 ends the operation.

The processor 11 of the image processing device 1 may acquire user information from the authentication server 4 by using the access token. Further, the processor 11 may shift to the login state based on the user information.

Further, the processor 11 of the image processing device 1 may display the login URL as a character string on the operation panel 15.

Further, the processor 21 of the user terminal 2 may authenticate the user by a method other than biometric authentication. For example, the processor 21 may authenticate the user using an ID and a password. The processor 21 may also authenticate the user using a one-time password. The method by which the processor 21 authenticates the user is not limited to a specific method.

The authentication system configured as described above authenticates a user using a user terminal. If the authentication system succeeds in authenticating the user, the authentication system transmits an authentication code from the authentication server to the cooperation server via the user terminal. If the authentication system transmits the authentication code to the cooperation server, the cooperation server transmits the authentication code to the image processing device. The authentication system transmits an access token to the image processing device using the authentication code. As a result, even if the image processing device and the user terminal do not directly communicate with each other, the user can be authenticated by the user terminal, and information related to login can be transmitted to the image processing device.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
   a communication interface configured to communicate data relating to authentication between a terminal and an image processing device; and
   a processor configured to:
   receive a request for an authentication code from the image processing device via the communication interface, and
   transmit a response to the image processing device via the communication interface if the authentication code is received from the terminal via the communication interface, the response including the authentication code.

2. The device of claim 1, wherein
   the processor is configured to receive the authentication code from the terminal by redirection via the communication interface.

3. The device of claim 1, wherein
   the processor is configured to receive the request from the image processing device at predetermined intervals via the communication interface.

* * * * *